United States Patent [19]

Doornek

[11] Patent Number: 5,501,405

[45] Date of Patent: Mar. 26, 1996

[54] DISPENSER APPARATUS FOR SPREADING PARTICULATE MATERIAL

[75] Inventor: James R. Doornek, Mequon, Wis.

[73] Assignee: Douglas Dynamics, Inc., Milwaukee, Wis.

[21] Appl. No.: 270,453

[22] Filed: Jul. 5, 1994

[51] Int. Cl.$^6$ .................................................. A01C 17/00
[52] U.S. Cl. ........................................ 239/683; 239/687
[58] Field of Search ................................ 239/687, 683, 239/681, 666, 661, 650; 222/185, 460, 608; 377/320, 607

[56] References Cited

U.S. PATENT DOCUMENTS

| | | | |
|---|---|---|---|
| 469,370 | 2/1892 | Cutts . | |
| 1,063,420 | 6/1913 | Crawford . | |
| 1,253,218 | 1/1918 | Doremus | 222/185 |
| 1,734,632 | 11/1929 | Merrill | 366/320 |
| 2,594,072 | 4/1952 | Ridley | 222/185 |
| 2,897,926 | 8/1959 | Hawthorne | 189/3 |
| 3,045,840 | 7/1962 | Donelson, Jr. | 239/683 |
| 3,094,334 | 6/1963 | Middleton et al. | 275/8 |
| 3,203,703 | 8/1965 | Van Der Lely et al. | 275/15 |
| 3,223,290 | 12/1965 | Schuld | 222/185 |
| 3,365,103 | 1/1968 | Van Der Lely et al. | 222/176 |
| 3,559,894 | 2/1971 | Murray et al. | 239/672 |
| 3,593,892 | 7/1971 | Petit | 222/200 |
| 3,602,394 | 8/1971 | McCune | 222/43 |
| 3,710,986 | 1/1973 | Lepley | 222/185 |
| 3,738,546 | 6/1973 | Speicher | 222/561 |
| 3,819,120 | 6/1974 | Walker | 239/661 |
| 3,948,421 | 4/1976 | Marchadour | 222/240 |
| 4,223,044 | 9/1980 | Se | 426/318 |
| 4,957,404 | 9/1990 | Lepley | 366/607 |
| 5,188,808 | 2/1993 | Lilja et al. | 366/320 |

FOREIGN PATENT DOCUMENTS

| | | | |
|---|---|---|---|
| 1474822 | 3/1967 | France | 239/654 |
| 2803166 | 8/1978 | Germany | 366/320 |

Primary Examiner—Andres Kashnikow
Assistant Examiner—Lesley D. Morris
Attorney, Agent, or Firm—Michael, Best & Friedrich

[57] ABSTRACT

A dispenser apparatus for spreading granular material such as salt or sand. The dispenser apparatus includes a hopper that funnels the granular material down to a discharge spout for discharge onto a rotating spreader to broadcast the material onto a roadway. The hopper defines a generally downwardly converging chute that has intermittent radially enlarged sections to minimize "bridging" of the granular material within the hopper. An agitator arrangement provided in the hopper also assists in eliminating any blockage near the base of the hopper.

17 Claims, 2 Drawing Sheets

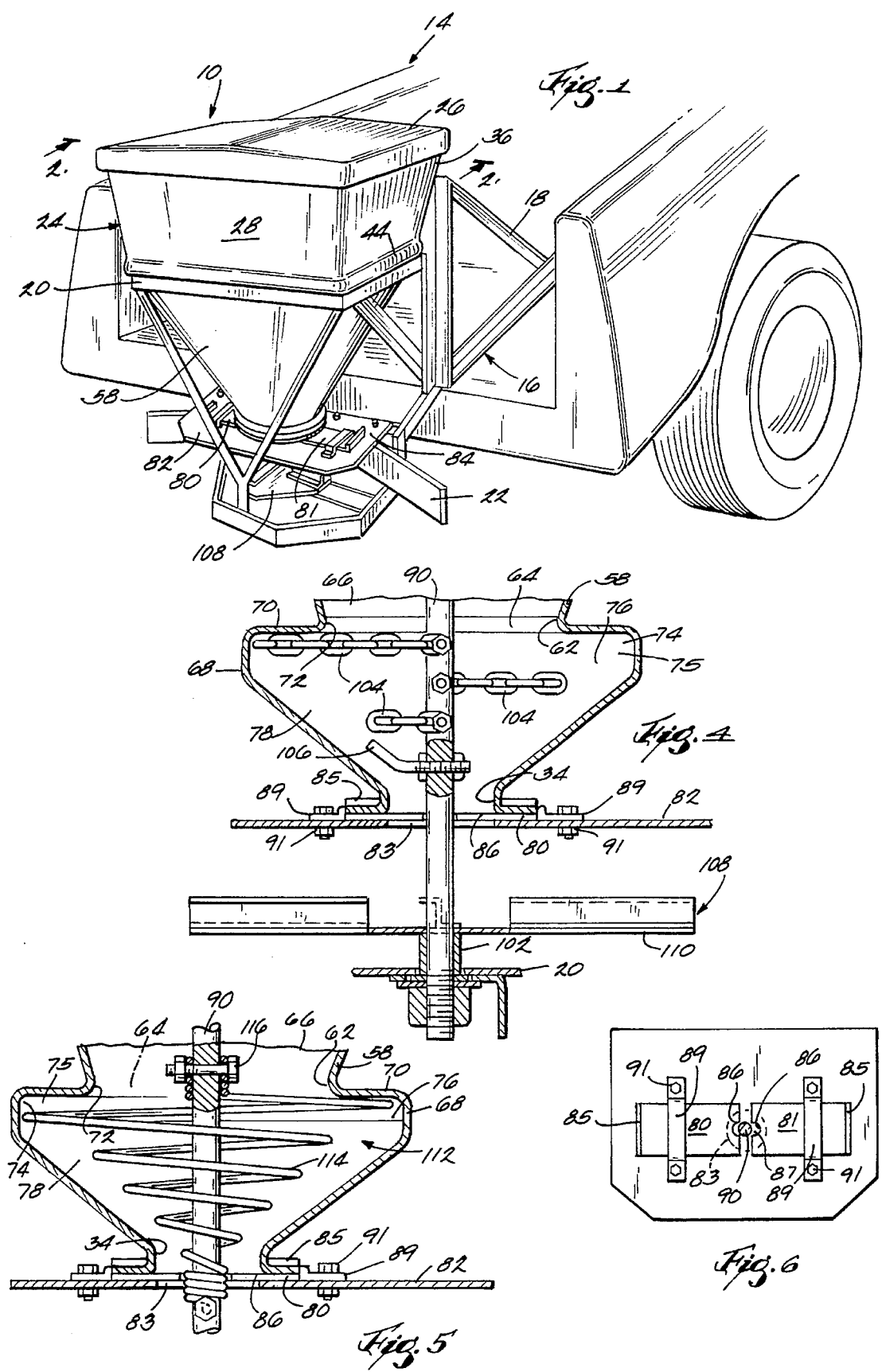

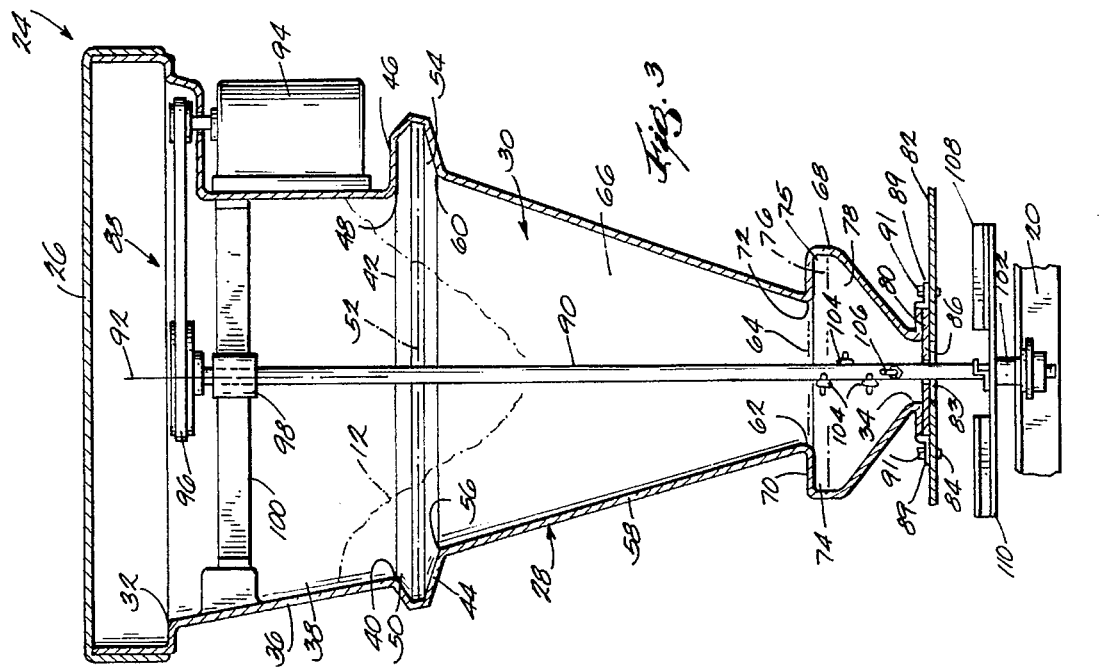
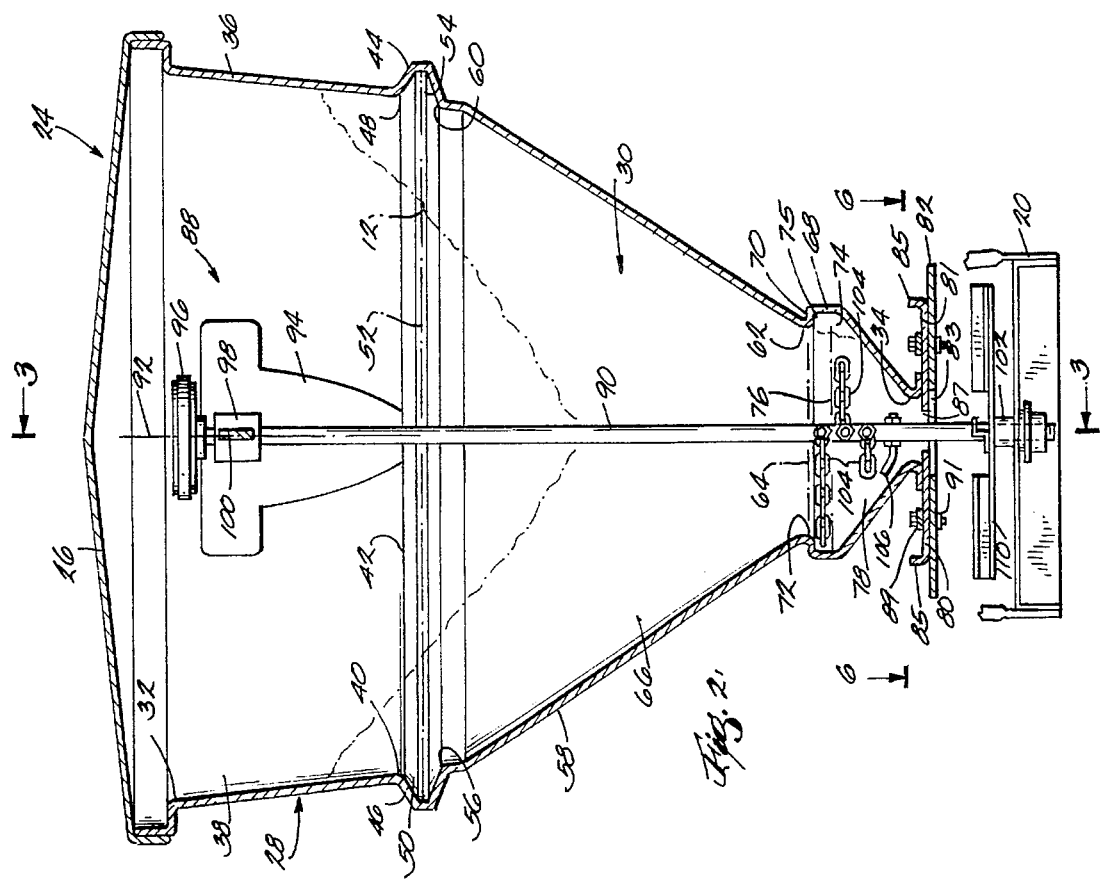

DISPENSER APPARATUS FOR SPREADING PARTICULATE MATERIAL

BACKGROUND OF THE INVENTION

1. Field of the Invention

The invention relates generally to bulk material dispensers, and more particularly to dispensers for particulate material such as salt, sand and the like.

2. Reference to Prior Art

Broadcast spreaders or dispensers are commonly used for spreading metered amounts of particulate material. A known broadcast dispenser includes a hopper that holds the particulate material and that funnels that material down to a discharge spout. From the discharge spout the material pours onto a rotating broadcast apparatus to be cast over a desired surface.

To encourage free flow of material out of the discharge spout and to prevent blockages in the hopper due to material agglomeration or "bridging", it is known to provide the hopper with an agitator. As used herein, "bridging" means that particulate material forms a blockage or bridge extending between opposite sides of the hopper, such that a space beneath the blockage is empty. The agitator is positioned within the hopper and typically includes a rotating shaft and agitating members secured to the shaft so that they mix the material as the shaft rotates. Known agitator members include, for example, an auger arrangement (U.S. Pat. No. 3,948,421 issued Apr. 6, 1976) or chains that are thrown outwardly by the centrifugal force generated by the shaft (U.S. Pat. No. 3,223,290 issued Dec. 14, 1965).

In one application, broadcast dispensers are used to spread salt or sand over surfaces such as roadways and walkways. Examples of such dispensers are provided in U.S. Pat. No. 3,819,120 issued Jun. 25, 1974 and U.S. Pat. No. 3,559,894 issued Feb. 2, 1971. Both of those patents illustrate dispensers mounted on vehicles, such as on the back of a pick-up truck.

SUMMARY OF THE INVENTION

The invention provides an improved dispenser apparatus for spreading particulate material, such as granular or powder material, for example. The dispenser apparatus incorporates an improved hopper that is configured to reduce or eliminate "bridging" within the hopper to encourage the gravity flow of material. The dispenser apparatus also includes an economical agitator apparatus that has minimal power requirements and that cooperates with the hopper configuration to ensure substantially clog-free operation of the dispenser apparatus.

The dispenser apparatus addresses the problem of "bridging" by providing successive hopper stages that define successfully smaller downwardly converging chute sections. At least a selected one or more of the chute sections (and preferably alternating chute sections) have portions that are radially enlarged relative to the base or outlet of the preceding chute section to provide an expansion area or zone. Applicant has discovered that the provision of such an expansion zone(s) decreases the occurrence of bridging. Also, by using the foregoing hopper configuration, an agitator arrangement used in the dispenser apparatus can be downsized for more economical manufacture and operation.

In particular, the invention provides a dispenser apparatus including a hopper defining an enclosed chute for holding particulate material. The hopper includes a first stage that defines a downwardly narrowing first chute section and that has a lower portion defining a first stage outlet. The hopper also includes a second stage that defines a second chute section and that has a lower portion defining a second stage outlet. The second chute section has a downwardly narrowing portion and a portion below the first stage outlet that has a horizontal cross-sectional area (i.e. cross-sectional area in a horizontal plane) that is greater than the horizontal cross-sectional area of the first stage outlet so that the second chute section is expanded relative to the first stage outlet before narrowing to the second stage outlet. A dispenser apparatus of the invention is also provided with an agitating arrangement for minimizing agglomeration to further encourage a smooth flow of material out of the second stage outlet (i.e., discharge spout) and onto a broadcast mechanism for spreading the hopper contents.

Other features and advantages of the invention will become apparent to those skilled in the art upon review of the detailed description, claims and drawings.

BRIEF DESCRIPTION OF THE DRAWINGS

FIG. 1 is a perspective view of a dispenser apparatus shown mounted in the bed of a pick-up truck.

FIG. 2 is an enlarged partial cross-sectional view of a portion of the dispenser apparatus take along line 2—2 in FIG. 1.

FIG. 3 is a partial cross-sectional view taken along line 3—3 in FIG. 2.

FIG. 4 is an enlarged partial view of a portion of the dispenser shown in FIG. 3, with the shaft and chains rotated 90°.

FIG. 5 is a partial cross-sectional view similar to FIG. 4 and showing an alternative agitator arrangement.

FIG. 6 is a view taken generally along line 6—6 in FIG. 2, showing the cover plates and bottom plate.

While one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood the phraseology and terminology used herein is for the purpose of description and should not be regarded as limiting.

DESCRIPTION OF PREFERRED EMBODIMENTS

Illustrated in FIG. 1 is a dispenser apparatus 10 which embodies the invention and which is used to store and, when desired, dispense granular or particulate material 12 (see FIGS. 2 and 3). While the dispenser apparatus 10 is useful in various applications and could be mounted on various support structures, such as on its own dedicated cart (not shown) for example, in the particular embodiment illustrated in the drawings the dispenser apparatus 10 is mounted on the back of a pick-up truck 14 to spread salt or sand over ice or snow covered roadways or sidewalks.

As shown in FIG. 1, the dispenser apparatus 10 includes a frame 16. The frame 16 includes brackets 18 (only one is shown) secured to the bed of the truck 14 and a basket-like support structure 20 fixed to the brackets 18. The support structure 20 is selectively detachable from the brackets 18 via pins (not shown). The frame 16 also includes a deflector 22 to keep particulate material 12 dispensed by the dispenser apparatus 10 away from the truck 14. The position of the deflector 22 is adjustable to control the spreading pattern of particulate material 12 broadcast from the broadcast apparatus (described below).

The dispenser apparatus 10 also includes a vertically oriented funnel member or hopper 24 that is provided with a removeable cover 26. The hopper 24 includes a tubular side wall 28 that defines (FIGS. 2 and 3) a generally downwardly converging chute 30 for receiving the particulate material 12. As shown in FIGS. 2 and 3, the side wall 28 is configured to provide vertically successive tubular stages that are joined such that the side wall 28 remains substantially continuous. The chute 30, by virtue of the continuous side wall 28, is enclosed except for an upper inlet opening 32 which is normally closed by the cover 26 and a lower outlet opening or discharge spout 34 which can be opened, when desired, to dispense the particulate material 12, as is further explained below. While the hopper side wall 28 can be configured to include any desired number of stages, in the illustrated arrangement the hopper side wall 28 has four stages with alternating ones of the stages being expanded.

More particularly, as shown in FIGS. 2 and 3 the hopper 24 includes an uppermost stage 36 that defines a downwardly converging chute section 38. The upper portion of the uppermost stage 36 defines the inlet opening 32, and the lower portion or base of the uppermost stage 36 defines an outlet opening 40 having a horizontal cross-sectional area indicated by reference numeral 42.

The hopper 24 also includes an expanded first intermediate stage 44 that extends downwardly from the base of the uppermost stage 36. The first intermediate stage 44 rests on the support structure 20 (see FIG. 1), and thus supports the hopper 24 in the support structure 20. With reference again to FIGS. 2 and 3, the first intermediate stage 44 has a wall section 46 at the upper end thereof. The wall section 46 extends radially outwardly from the base of the uppermost stage 36 and defines an inlet opening 48 which is coextensive with the outlet opening 40 of the uppermost stage 36. Also, the first intermediate stage 44 defines a chute section 50 with a portion having a horizontal cross-sectional area (indicated by reference numeral 52) that is greater than the area 42 of the outlet opening 40 of the uppermost stage 36, so that the chute section 50 is expanded relative to outlet opening 40. The chute section 50 also has a downwardly converging portion 54 that narrows to an outlet opening 56 defined by the base of the first intermediate stage 44.

The hopper 24 also includes a second intermediate stage 58 extending downwardly from the base of the first intermediate stage 44. The second intermediate stage 58 includes an inlet opening 60 that is defined by the upper portion thereof and that is coextensive with the outlet opening 56 of the first intermediate stage 44. The second intermediate stage 58 also includes an outlet opening 62 defined by the base thereof, and outlet opening 62 has a horizontal cross-sectional area indicated by reference numeral 64. The second intermediate stage 58 also defines a chute section 66 that converges downwardly from inlet opening 60 to outlet opening 62.

The hopper 24 also includes a lowermost stage 68 extending downwardly from the second intermediate stage 58. The lowermost stage 68 includes a sidewall 69. The sidewall 69 of the lowermost stage 68 includes an upper wall section 70 at the upper end thereof. The upper wall section 70 extends radially outwardly from the base of the second intermediate stage 58 and defines an inlet opening 72 which is coextensive with the outlet opening 62 of the second intermediate stage 58. The lowermost stage 68 also defines a chute section 74 having an upper portion 75 with a horizontal cross-sectional area (indicated by reference numeral 76) that is greater than the area 64 of the outlet opening 62 of the second intermediate stage 58, so that the upper portion 75 of the chute section 74 is expanded relative to outlet opening 62. Chute section 74 also has a lower portion 78 that converges downwardly to the discharge spout 34. Like the outlet opening 56 of the first intermediate stage 44, the discharge spout 34 is narrower than the outlet opening of the preceding stage (i.e., outlet opening 62) to maintain the generally downwardly narrowing configuration of the chute 30.

To selectively open and close the discharge spout 34, the hopper 24 is provided with a pair of movable cover plates 80 and 81 (FIG. 3) slidably mounted in relation to the discharge spout 34. The cover plates 80 and 81 are supported beneath the discharge spout 34 by a fixed bottom plate 82. The bottom plate 82 is fixed to the lowermost stage 68 by screws (not shown) and to the support structure 20 by bolts (see FIG. 1). The bottom plate 82 has therein a discharge orifice 83 aligned with the discharge spout 34. The cover plates 80 and 81 are sandwiched between the bottom plate 82 and the discharge spout 34. The cover plates 80 and 81 are retained against the bottom plate 82 by respective straps 89 (see FIG. 6). Each strap 89 is secured to the bottom plate 82 by bolts 91. Each of the cover plates 80 and 81 includes an upwardly extending handle 85 and an arcuate inner edge portion 86. The cover plates 80 and 81 are mounted in mirror image relation on opposite sides of the discharge spout 34, such that the arcuate inner edge portions 86 cooperate to define an opening 87 for receiving the shaft (described below). The cover plates 80 and 81 are manually slidable relative to a closed position to enlarge the opening 87 (as shown in FIG. 3) about the shaft and thus permit particulate material 12 to flow out of the discharge spout 34 of the hopper 24. To close the discharge spout 34, the cover plates 80 and 81 are slid toward each other to close the opening 87 about the shaft.

To encourage the free flow of particulate material 12 within the hopper 24, the dispenser apparatus 10 is provided with means for agitating that material. In the particular embodiment illustrated in FIGS. 1–4, the means for agitating the particulate material 12 includes an agitator apparatus 88. As shown in FIGS. 2 and 3, the agitator apparatus 88 includes a shaft 90 mounted within the hopper 24 for rotation about a vertical axis 92, and suitable means such as a motor 94 and drive belt 96 for rotating the shaft 90. The shaft 90 is supported for rotation within the hopper 24 by an upper bearing 98 that is mounted on a bracket or motor channel 100 in the uppermost stage 36, and by a lower bearing 102 that is mounted on the lower end of the support structure 20.

The agitator apparatus 88 also includes agitating members attached to the shaft 90 so that they move through the particulate material 12 to discourage agglomeration when the shaft 90 is rotated. At least some of the agitating members are preferably flexible, and in the embodiment illustrated in FIGS. 1–4 the agitating members include chains 104 that are flung radially outwardly via centrifugal force when the shaft 90 is rotated. The agitating members also include a curved pin member 106 located just above the discharge spout 34. In the illustrated arrangement the chains 104 and the pin member 106 are positioned exclusively within the lowermost stage 68 to prevent agglomeration or clogging therein. If desired, agitating members could also be provided in the other stages.

To disperse or spread the particulate material 12 after it is dispensed from the hopper 12, the dispenser apparatus 10 is also provided with a broadcast apparatus 108. The broadcast apparatus 108 includes a plate 110 that is mounted on the shaft 90 for rotation therewith and that is positioned below the discharge spout 34 so that particulate material 12 poured onto the plate 110 is cast outwardly. As previously mentioned, particulate material 12 cast toward the truck 14 is deflected away by the deflector 22.

Advantageously, the hopper 24 is configured to provide intermittent stages 44 and 68 that define chute sections 50 and 74, respectively, which expand horizontally outwardly relative to the outlet openings 40 and 62 of preceding stages 36 and 58 to interrupt the downward convergence of the chute 30. Underlying the invention is the recognition that those expanded chute sections substantially reduce or prevent "bridging" within the hopper 24 to insure a smooth downflow of the particulate material 12 when the discharge spout 34 is open. Since the effects of "bridging" in the upper stages 36, 44 and 58 of the hopper 24 are lessened by the chute sections 50 and 74, the agitator apparatus 88 can be downsized to provide agitation in the lowermost stage 68. Thus, the power requirements for agitating the hopper 24 are relatively low compared to an apparatus including a larger agitator apparatus. Further, because the agitator apparatus 88 is located in the lowermost stage 68, and the lowermost stage 68 includes the chute section 74, the agitator apparatus 88 can agitate particulate material 12 in the lowermost stage 68 without propelling particulate material 12 up into the second intermediate stage 58. Also, because the agitator apparatus 88 is located in the lowermost stage 68, any agglomeration or sticking of the particulate material 12 to the sidewall 69 is limited to the portion of the lowermost stage 68 below the agitator apparatus 88 and above the downspout 34. Since space between the sidewall 69 and the rotating shaft 90 in this portion of the lowermost stage 68 is limited, agglomeration or sticking of the particulate material 12 to the sidewall 69 is negligible.

Illustrated in FIG. 5 is an alternative agitator apparatus 112 which replaces the chains 104 and pin member 106 in FIGS. 1–4 with an auger member. In the illustrated embodiment the auger member is a helical spring member 114 that is secured to the shaft 90 by fasteners 116 or other suitable means. Like the chains 104 and the pin member 106, the spring member 114 is substantially confined to the lowermost stage 68 to agitate and promote gravity flow of the particulate material therein.

Other features and advantages of the invention are set forth in the following claims.

I claim:

1. A dispenser apparatus for particulate material, said dispenser apparatus comprising:

a hopper defining an enclosed chute for the particulate material, said hopper including a plurality of vertically successive stages including an uppermost stage, a lowermost stage, and at least one intermediate stage between said uppermost and lowermost stages, each of said stages defining a chute section having a downwardly narrowing portion, and each of said stages including an upper portion defining an inlet opening, and lower portion defining an outlet opening, the outlet opening of each of said uppermost and intermediate stages being coextensive with said inlet opening of a succeeding one of said stages, and said outlet opening of each of said stages defining a horizontal cross-sectional area, the horizontal cross-sectional area defined by said outlet opening of each of said lowermost and intermediate stages being smaller than the horizontal cross-sectional area defined by said outlet opening of each preceding one of said stages, and said chute section defined by said lowermost stage including a top portion immediately below said outlet opening of an immediately preceding one of said stages, said top portion defining a cross-sectional area in a horizontal plane that is greater than said cross-sectional area defined by said outlet opening of said immediately preceding one of said stages so that the top portion of the lowermost chute section is expanded relative to said outlet opening of said immediately preceding one of said stages before narrowing to the outlet opening thereof, and means in said hopper for agitating the particulate material.

2. A dispenser as set forth in claim 1 wherein said chute section defined by one of said at least one intermediate stage includes a top portion that defines a cross-sectional area in a horizontal plane which is greater than said cross-sectional area defined by said outlet opening of an immediately preceding one of said stages so that the top portion of the chute section of said one of said at least one intermediate stage is expanded relative to said outlet opening of said immediately preceding one of said stages.

3. A dispenser apparatus as set forth in claim 1 wherein said stages are joined to form a continuous hopper side wall.

4. A dispenser apparatus as set forth in claim 1 and further comprising a broadcast apparatus for spreading the particulate material, said broadcast spreading apparatus being supported below said outlet opening of said lowermost stage.

5. A dispenser apparatus as set forth in claim 1 wherein said means for agitating the particulate material includes a shaft mounted within said hopper for rotation about a generally vertical axis.

6. A dispenser apparatus as set forth in claim 5 wherein said means for agitating the particulate material includes an agitator mounted on said shaft, said agitator being positioned within said second chute section.

7. A dispenser apparatus as set forth in claim 6 wherein said agitator includes a helical spring.

8. A dispenser apparatus as set forth in claim 6 wherein said agitator includes at least one flexible member, said flexible member extending radially outwardly from said shaft when said shaft is rotated.

9. A dispenser apparatus as set forth in claim 8 wherein said flexible member is a chain.

10. A dispenser apparatus for particulate material, said dispenser apparatus comprising a vertically extending hopper, said hopper defining an enclosed chute, and said hopper including at least three successive stages, each of said stages defining a downwardly converging chute section, and each of said stages including an upper portion defining an inlet opening, and a lower portion defining an outlet opening having a horizontal cross-sectional area, said horizontal cross-sectional area of said outlet opening of each of the stages being less than the horizontal cross-sectional area of said outlet opening of any and all preceding ones of said stages, said chute sections of at least alternating ones of said stages each having a portion with a horizontal cross-sectional area greater than said horizontal cross-sectional area of said outlet opening of the immediately preceding one of said stages so that each of said chute sections of said at least alternating ones of said stages is expanded relative to said outlet opening of the immediately preceding one of said stages, and an agitator disposed in said hopper for moving through the particulate material and thereby preventing agglomeration of particulate material in said hopper.

11. A dispenser apparatus as set forth in claim 10 wherein said plurality of successive stages includes an uppermost stage, a lowermost stage, and intervening stages between said uppermost stage and said lowermost stage, said lowermost stage being one of the at least alternating ones of said stages, and wherein said inlet opening of each of said alternating ones of said stages is coextensive with said outlet opening of the preceding one of said stages.

12. A dispenser apparatus as set forth in claim 11 wherein said plurality of stages are joined to form a continuous hopper side wall.

13. A dispenser apparatus as set forth in claim 11 wherein said agitator apparatus includes an agitator member positioned within said chute section defined by said lowermost stage.

14. A dispenser apparatus for particulate material, said dispenser apparatus comprising a hopper defining an enclosed chute for receiving particulate material, said hopper including at least three vertically successive stages, said vertically successive stages each defining an inlet opening, an outlet opening, and a downwardly converging chute section between said inlet and outlet openings, said outlet openings being successively narrower in a downward direction, at least one of said chute sections expanding horizontally outward from said outlet opening of the immediately preceding one of said chute sections to provide an expanded chute section, and an agitator apparatus mounted within said hopper for discouraging agglomeration of the particulate material.

15. A dispenser apparatus as set forth in claim 14 wherein alternating ones of said chute sections expand horizontally outward from said outlet openings of the immediately preceding ones of said chute sections to provide expanded chute sections, said at least one of said chute sections being one of said alternating ones of said chute sections.

16. A dispenser apparatus as set forth in claim 16 wherein said vertically successive stages are joined to form a continuous hopper side wall.

17. A dispenser apparatus as set forth in claim 14 wherein said vertically successive stages include a lowermost stage, said lowermost stage being said at least one of said chute sections.

* * * * *

UNITED STATES PATENT AND TRADEMARK OFFICE
CERTIFICATE OF CORRECTION

PATENT NO. : 5,501,405
DATED : March 26, 1996
INVENTOR(S) : James R. Doornek

It is certified that error appears in the above—identified patent and that said Letters Patent is hereby corrected as shown below:

Claim 16, column 8, line 16, delete "Claim 16" and insert
--Claim 14--.

Claim 17, column 8, line 21, delete "being said at" and insert
--being at--.

Signed and Sealed this

Twenty-seventh Day of August, 1996

Attest:

BRUCE LEHMAN

Attesting Officer    Commissioner of Patents and Trademarks